United States Patent
Izawa

(10) Patent No.: US 9,533,895 B2
(45) Date of Patent: Jan. 3, 2017

(54) DEVICE FOR TREATING FLUORINE-CONTAINING WATER

(71) Applicant: KURITA WATER INDUSTRIES LTD., Nakano-ku, Tokyo (JP)

(72) Inventor: Shuhei Izawa, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 14/713,653

(22) Filed: May 15, 2015

(65) Prior Publication Data

US 2015/0246827 A1    Sep. 3, 2015

Related U.S. Application Data

(62) Division of application No. 13/503,244, filed as application No. PCT/JP2010/068304 on Oct. 19, 2010.

(30) Foreign Application Priority Data

Oct. 22, 2009   (JP) .................. 2009-243519

(51) Int. Cl.
| | |
|---|---|
| C02F 1/52 | (2006.01) |
| C02F 1/28 | (2006.01) |
| C02F 1/00 | (2006.01) |
| C02F 1/68 | (2006.01) |
| C02F 101/14 | (2006.01) |
| C02F 103/34 | (2006.01) |

(52) U.S. Cl.
CPC ............... *C02F 1/281* (2013.01); *C02F 1/001* (2013.01); *C02F 1/5236* (2013.01); *C02F 1/683* (2013.01); C02F 2101/14 (2013.01); C02F 2103/346 (2013.01)

(58) Field of Classification Search
CPC .................................. C02F 1/001; C02F 1/281
See application file for complete search history.

(56) References Cited

U.S. PATENT DOCUMENTS 5,702,594 A * 12/1997 Yamasaki ............... C02F 1/281
                                                                    210/151
2009/0152193 A1* 6/2009 Yamasaki ................. C02F 3/06
                                                                    210/610

FOREIGN PATENT DOCUMENTS

WO    WO-2008113840 A1 *  9/2008 .............. B01J 20/04

* cited by examiner

*Primary Examiner* — Peter Keyworth
(74) *Attorney, Agent, or Firm* — Manabu Kanesaka

(57) ABSTRACT

A device for treating fluorine-containing water includes a fluorine treating unit treating the fluorine-containing water in which calcium carbonate packed towers are arranged in series in a plurality of stages; a fluorine passing unit passing the fluorine-containing water through the fluorine treating unit; an extracting unit extracting treated water from the fluorine treating unit; and a recovery unit recovering calcium fluoride from the calcium carbonate packed towers.

5 Claims, 4 Drawing Sheets

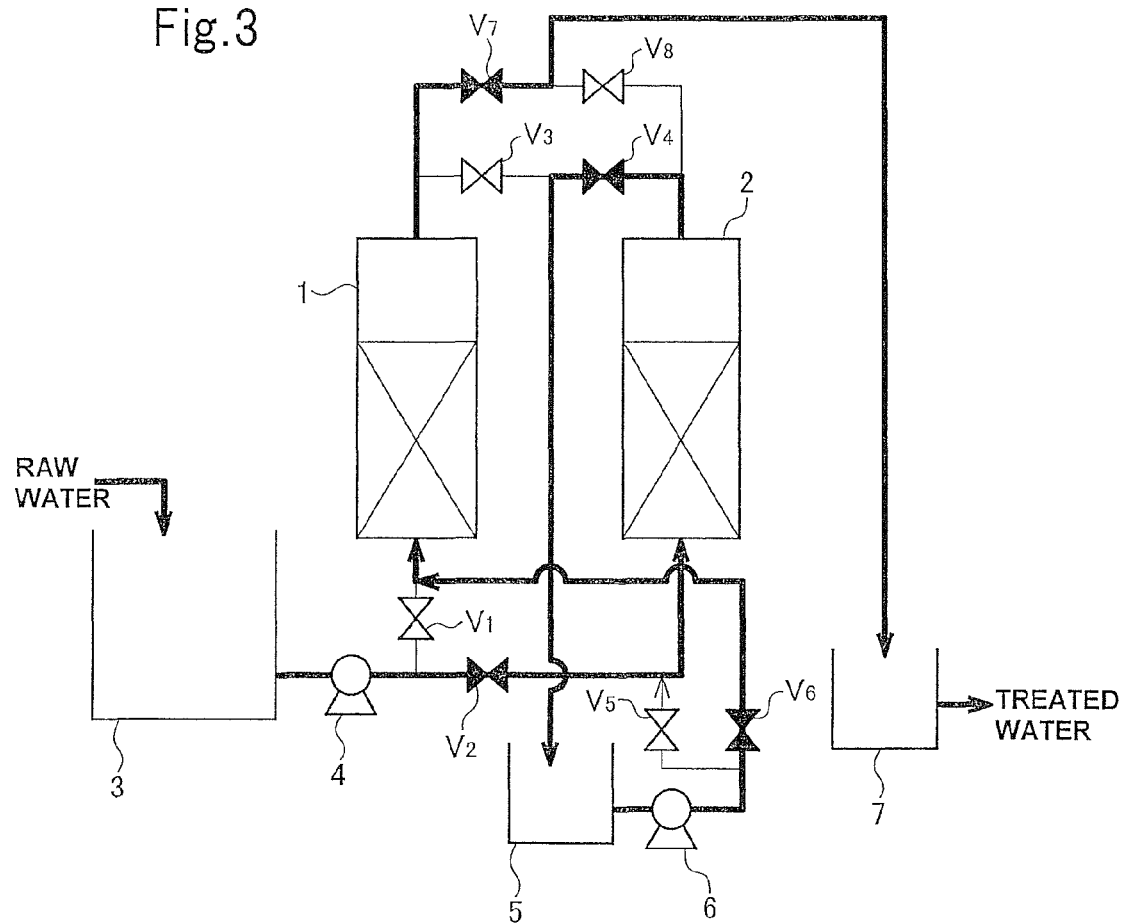

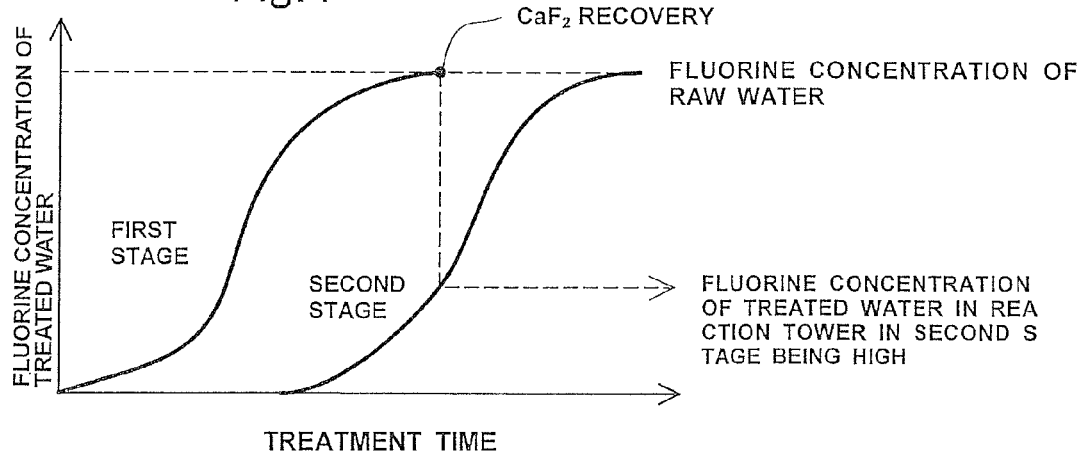
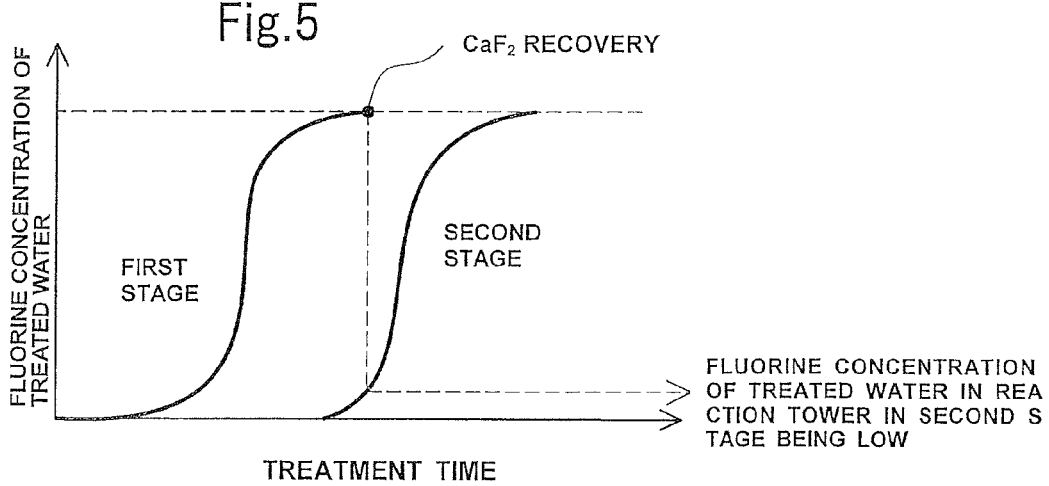

DEVICE FOR TREATING FLUORINE-CONTAINING WATER

RELATED APPLICATIONS

The present application is a divisional application of U.S. patent application Ser. No. 13/503,244 filed on Jul. 9, 2012, which is a national phase entry of International Application No. PCT/JP2010/068304 filed on Oct. 19, 2010, which claims priority from Japanese Application No. 2009-243519 filed on Oct. 22, 2009, the disclosure of which are incorporated herein by reference.

FIELD OF INVENTION

The present invention relates to a device for treating fluorine-containing water, and more particularly relates to a device for treating fluorine-containing water for removing fluorine highly from fluorine-containing water such as waste water containing a fluorine-based etching agent, and efficiently recovering the removed fluorine as calcium fluoride having high purity.

BACKGROUND OF INVENTION

A large amount of an etching agent which contains hydrogen fluoride or hydrogen fluoride and ammonium fluoride as main ingredients has been used in a semiconductor manufacturing process, a related process thereof, or a surface treatment process of various materials including metal materials, single crystal materials, optical materials, and the like. An etching agent which contains hydrogen fluoride as a main ingredient or an etching agent which contains hydrogen fluoride and ammonium fluoride (buffered hydrofluoric acid) as main ingredients contains high levels of fluorine as HF. Therefore, when these etching agents flow into a waste water system, waste water thereof become to contain fluorine at a high concentration. As materials treated with etching agents are washed with a large amount of cleaning water during etching process and after the process, a large amount of waste water containing low levels of fluorine is discharged from the washing process.

According to a conventional method, waste water containing high levels of fluorine and waste water containing low levels of fluorine are mixed and treated. Patent Document 1 discloses a method for treating fluorine-containing waste water wherein the waste water is fed to and passed through a reaction tower packed with granular calcium carbonate.

The method described in Patent Document 1, treatment is performed by a merry-go-round method, in which a plurality of towers packed with calcium carbonate are arranged in series. First, raw water is sequentially passed from a first tower (tower in a first stage) to the following tower(s) to remove and recover fluorine. When the fluorine concentration of the raw water flowing into the first tower and the fluorine concentration of the treated water flowed out from the first tower become almost the same, feeding raw water to the first tower is stopped, the calcium fluoride is recovered from the first tower, and the first tower is packed with fresh calcium carbonate. Then, raw water is fed to and passed through the second tower, and flows sequentially to the following tower(s) for the first tower.

Patent Document 1 describes that granular calcium carbonate packed in each calcium carbonate packed tower has a diameter of about 0.1 to 0.5 mm, and specifically granular calcium carbonate having a diameter of 0.25 mm is used in Examples thereof.

Patent Document 2 discloses a method for removing fluorine from fluorine-containing raw water including a process of feeding the raw water to a reaction tower packed with granular calcium carbonate to remove the fluorine, wherein acid or alkali is added to the raw water based on an $\alpha$-value calculated from measured values of fluorine concentration and acid concentration in the raw water.

LIST OF DOCUMENTS

Patent Document 1: Japanese Patent 3466637
Patent Document 2: Japanese Patent 2565110

The method described in Patent Document 1 has a problem that, in order to recover high purity calcium fluoride from the calcium carbonate packed towers, raw water is passed until the fluorine concentration of the raw water flowing into the tower in the first stage and the fluorine concentration of the treated water therefrom become almost the same, i.e., the fluorine removal ratio of the calcium carbonate packed tower in the first stage becomes almost zero. As a result thereof, fluorine leaks into the treated water of the calcium carbonate packed tower (reaction tower) in the second stage as illustrated in FIG. 4, so that the fluorine removal ratio becomes low. For example, in Example 1 of Patent Document 1, when the fluorine removal ratio of the first tower packed with the calcium carbonate is 0%, the fluorine removal ratio of the second tower is 72.7 to 77.6%, i.e., the fluorine removal ratio of the entire device is 72.7 to 77.6%, so that treated water of high water quality cannot be obtained.

In order to solve the above problem, it has also been designed to increase the number of the towers packed with calcium carbonate and to arrange the calcium carbonate packed towers in series in three or more stages. However, in this case, the treating device is enlarged in its scale, which is not preferable in every respect of the device cost, installation area, maintenance, and the like.

OBJECT AND SUMMARY OF INVENTION

It is an object of the present invention to solve the above-described problems, and provide a method and a device for treating fluorine-containing water capable of removing fluorine in fluorine-containing water efficiently and recovering high purity calcium fluoride when treating the fluorine-containing water by passing the same through plurality of, preferably two, calcium carbonate packed towers arranged in series.

The present inventors have conducted extensive research for solving the above-described problems, and have found that an increase in the purity of the recovered calcium fluoride and an increase in the fluorine removal ratio can be realized with a relatively small device by the use of calcium carbonate granules having a specific volume mean granule diameter.

The present invention has been accomplished based on such findings, and the gist thereof is described below.

A first aspect provides a method for treating fluorine-containing water including passing fluorine-containing water through calcium carbonate packed towers arranged in series in a plurality of stages to remove fluorine in the fluorine-containing water and recover calcium fluoride, in which the calcium carbonate granules packed in each tower have a volume mean diameter of 30 to 150 µm.

A second aspect provides a method for treating fluorine-containing water in which the calcium carbonate packed towers are arranged in series in two stages in the first aspect.

A third aspect provides a method for treating fluorine-containing water in which the calcium carbonate granules contain granules having a diameter of lower than 20 μm at a ratio of 15% or lower in the first or second aspect.

A fourth aspect provides a method for treating fluorine-containing water in which the fluorine-containing water is passed through the calcium carbonate packed towers at a space velocity (SV) of 0.1 to 5 hr$^{-1}$ in any one of the first to third aspects.

A fifth aspect provides a device for treating fluorine-containing water, having a unit for treating fluorine-containing water in which calcium carbonate packed towers are provided in series in a plurality of stages, a unit for passing fluorine-containing water through the unit for treating fluorine-containing water, a unit for extracting treated water from the unit for treating fluorine-containing water, and a unit for recovering calcium fluoride from the calcium carbonate packed towers, in which the volume mean diameter of the calcium carbonate packed in the calcium carbonate packed towers is 30 to 150 μm.

A sixth aspect provides a device for treating fluorine-containing water in which the calcium carbonate packed towers of the unit for treating fluorine-containing water are arranged in series in two stages in the fifth aspect.

A seventh aspect provides a device for treating fluorine-containing water in which the calcium carbonate granules contain granules having a diameter of lower than 20 μm at a ratio of 15% or lower in the fifth or sixth aspect.

An eighth aspect provides a device for treating fluorine-containing water in which the fluorine-containing water is passed through the calcium carbonate packed towers at an SV of 0.1 to 5 hr$^{-1}$ in any one of the fifth to seventh aspects.

Advantageous Effects of Invention

According to the present invention, an increase in the fluorine removal ratio and an increase in the purity of calcium fluoride can be realized with a relatively small device by the use of calcium carbonate granules having a specific volume mean diameter when passing fluorine-containing water through a plurality of calcium carbonate packed towers in series to remove the fluorine in the fluorine-containing water and recover the removed fluorine as calcium fluoride.

BRIEF DESCRIPTION OF DRAWINGS

FIG. 3 is a system diagram illustrating a second water passage direction in the device for treating fluorine-containing water of FIG. 1.

FIG. 4 is a graph illustrating the breakthrough curve of fluorine in a conventional method (Diameter of calcium carbonate granules: 250 μm).

FIG. 5 is a graph illustrating the breakthrough curve of fluorine in a method of the invention (Diameter of calcium carbonate granules: 90 μm).

DESCRIPTION OF EMBODIMENTS

Hereinafter, embodiments of a method and a device for treating fluorine-containing water of the invention are described in detail with reference to the drawings.

Figure 1:
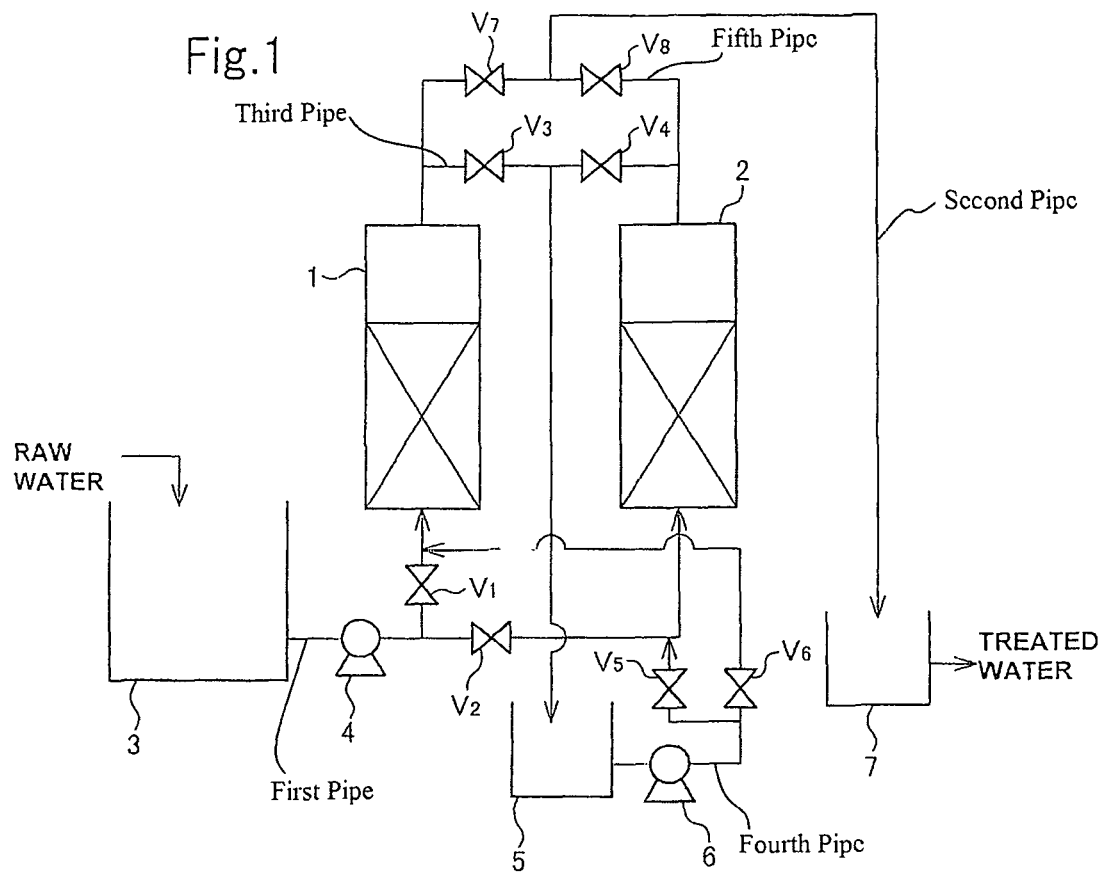
FIG. 1 is a system diagram illustrating an embodiment of a device for treating fluorine-containing water of the invention.
Figure 2:
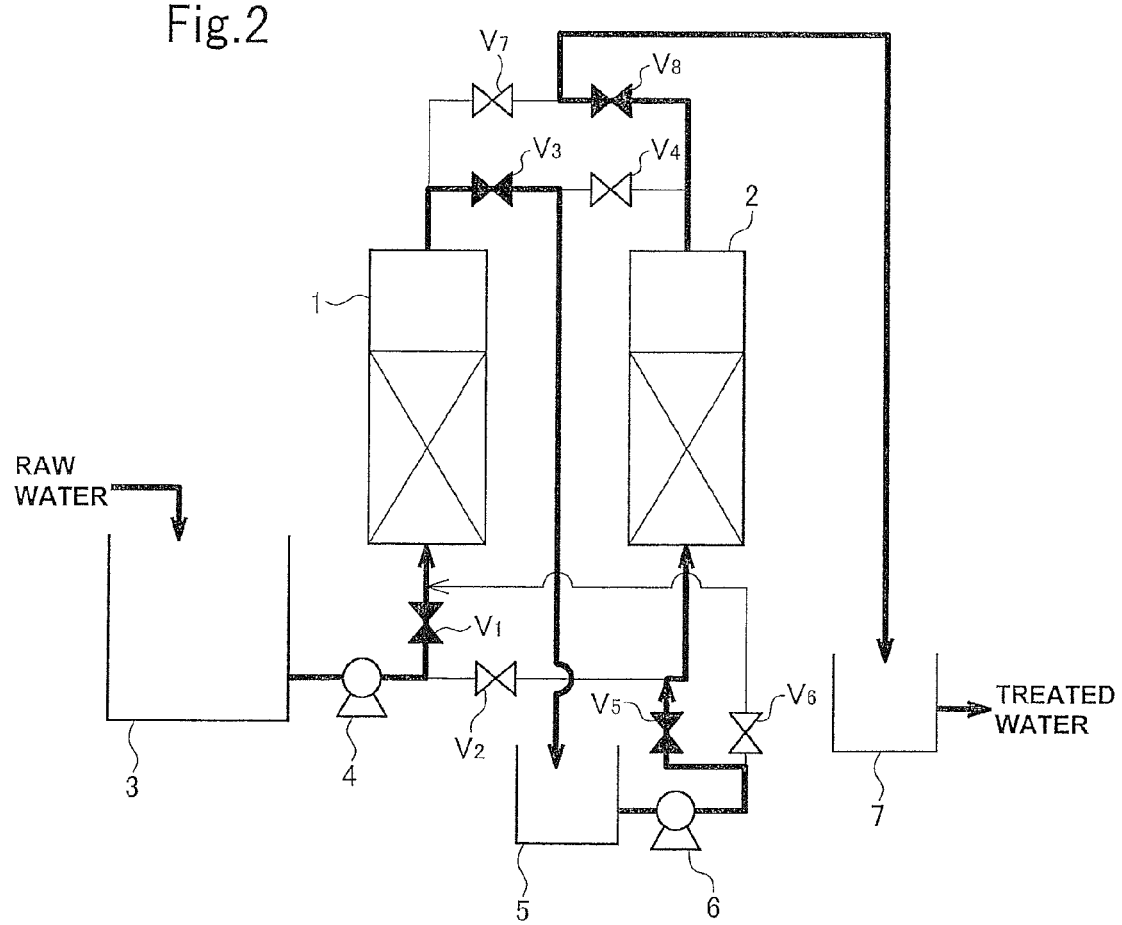
FIG. 2 is a system diagram illustrating a first water passage direction in the device for treating fluorine-containing water of FIG. 1.

FIG. 1 is a system diagram illustrating an embodiment of a device for treating fluorine-containing water of the invention. FIGS. 2 and 3 are system diagrams illustrating water passage directions in the device for treating fluorine-containing water. The devices of FIGS. 1 to 3 include calcium carbonate packed towers 1 and 2, a raw water tank 3, a raw water pump 4, a reaction liquid tank 5, a reaction liquid transfer pump 6, a treated water tank 7, and opening-and-closing valves $V_1$ to $V_8$. In FIGS. 2 and 3, piping through which water passes is represented by a thick line and opened valves are represented by black and closed valves are represented by white.

The device for treating fluorine-containing water illustrated in FIG. 1 is provided with water passage piping and valves in such a manner as to realize water passage of a merry-go-round system capable of switching a first water passage direction in which raw water (fluorine-containing water) is sequentially passed through the tower 1 and the tower 2 (FIG. 2) and a second water passage direction in which raw water is sequentially passed through the tower 2 and the tower 1 (FIG. 3).

The device for treating fluorine-containing water illustrated in FIG. 1 is one example of the device for treating fluorine-containing water of the invention, and the invention is not limited to the device for treating fluorine-containing water illustrated in FIG. 1. For example, the device can be configured so that the calcium carbonate packed towers are arranged in series in three or more stages. However, in terms of the object of the invention of realizing an increase in the fluorine removal ratio and an increase in the purity of the recovered calcium fluoride without increasing the size of the device, it is preferable to provide the calcium carbonate packed towers in series in two stages.

In FIG. 1, although water is passed through the towers 1 and 2 in an upward flow, the flow can be changed to a downward flow. However, in the treatment of fluorine-containing water, carbonic acid gas is emitted as described later due to a reaction of calcium carbonate and hydrogen fluoride. Therefore, in the case of a downward flow, a water break phenomenon arises in the towers due to the gas flow, and the reaction is hindered by deflection of the water current. Therefore, an upward flow is preferable.

The device for treating fluorine-containing water of FIG. 1 includes:

a first pipe connected to the calcium carbonate packed towers configured to pass the fluorine-containing water through the calcium carbonate packed towers, and having one portion connected to one of the calcium carbonate packed towers and having a first valve $V_1$, and another portion connected to another of the calcium carbonate packed towers through a second valve $V_2$;

a second pipe connected to the one or another of the calcium carbonate packed towers configured to extract treated water from the calcium carbonate packed towers;

a third pipe having one portion connected to the one of the calcium carbonate packed towers and having a third valve $V_3$, and another portion connected to the another of the calcium carbonate packed towers through a fourth valve $V_4$;

a fourth pipe connected to the reaction water tank 5 and including a portion connected to an inlet of the another of the calcium carbonate packed towers and having a fifth valve $V_5$, and another portion connected to an inlet of the one of the calcium carbonate packed towers and having a sixth valve $V_6$; and a fifth pipe connected to the treated water tank 7 through the second pipe, and including a portion connected to an exit of the one of the calcium carbonate packed towers and having a seventh valve $V_7$, and another portion connected to an exit of the another of the calcium carbonate packed towers and having an eighth valve $V_8$.

The raw water tank 3 is connected to the first pipe to supply the fluorine-containing water in the raw water tank to one or another of the calcium carbonate packed towers; the reaction liquid tank 5 is arranged between the calcium carbonate packed towers; and the treated water tank 7 is connected to the one or another of the calcium carbonate packed towers through the second pipe.

In the device for treating fluorine-containing water of FIG. 1, first, the valves $V_1$, $V_3$, $V_5$, and $V_8$ are opened and the valves $V_2$, $V_4$, $V_6$, and $V_7$ are closed as illustrated in FIG. 2. Then, raw water in the raw water tank 3 is passed through the tower 1 to supply outflow water of the tower 1 to the reaction liquid tank 5 with the raw water pump 4, the liquid in the reaction liquid tank 5 is passed through the calcium carbonate packed tower 2 with the pump 6, and then the outflow water is extracted as treated water through the treated water tank 7.

Thus, the raw water is passed through the tower 1 and the tower 2 in this order to be treated. When the fluorine removal ratio of the tower 1 becomes almost 0% i.e., when the fluorine concentration of the inflow raw water of the tower 1 and the fluorine concentration of the outflow water thereof becomes almost the same, the passage of the raw water into the tower 1 is stopped. Then, packed granules containing calcium fluoride generated by the reaction of the calcium carbonate and the fluorine in the raw water in the tower 1 are recovered and also fresh calcium carbonate granules are packed in the tower 1. Thereafter, the water passage direction of the raw water is switched to set the direction to the water passage direction illustrated in FIG. 3.

Namely, the valves $V_2$, $V_4$, $V_6$, and $V_7$ are opened and the valves $V_1$, $V_3$, $V_5$, and $V_8$ are closed firstly. By this, the raw water in the raw water tank 3 is passed through the tower 2 to supply the outflow water of the tower 2 to the tank 5 with the pump 4. Then, the liquid in the tank 5 is passed through the tower 1 with the pump 6, and then the outflow water is extracted as treated water through the treated water tank 7.

Thus, the raw water is passed through the tower 2 and the tower 1 in this order to be treated. When the fluorine removal ratio of the tower 2 becomes almost 0% i.e., when the fluorine concentration of the inflow raw water of the tower 2 and the fluorine concentration of the outflow water thereof becomes almost the same, the passage of the raw water into the tower 2 is stopped. Then, packed granules containing calcium fluoride generated by the reaction of the calcium carbonate and the fluorine in the raw water in the tower 2 are recovered and also fresh calcium carbonate granules are packed in the tower 2. Thereafter, the water passage direction of the raw water is switched to set the direction to the water passage direction illustrated in FIG. 2.

Treatment thereafter is performed by switching the water passage direction of FIG. 2 and the water passage direction of FIG. 3 as described above.

In the invention, calcium carbonate granules having a volume mean diameter of 30 to 150 μm are used as the calcium carbonate to be packed in the calcium carbonate packed towers for treating fluorine-containing water.

When the volume mean diameter of the calcium carbonate granules is smaller than 30 μm, fine calcium carbonate granules leak from the calcium carbonate packed tower due to carbonic acid gas generated by the reaction of the calcium carbonate and the hydrogen fluoride in the raw water, resulting that the treatment becomes unstable and that the fluorine removal ratio decreases.

In contrast, when the volume mean diameter of the calcium carbonate granules is larger than 150 μm, the reaction rate of the calcium carbonate and the hydrogen fluoride is low, so that a sufficient fluorine removal ratio cannot be achieved by the two calcium carbonate packed towers as described later. Moreover, the progress of the reaction to the inside of the calcium carbonate granules takes long time, so that the purity of the recovered calcium fluoride becomes low.

By the use of calcium carbonate granules having a volume mean diameter of 30 to 150 μm, preferably 30 to 100 μm, and more preferably 40 to 90 μm, high purity calcium fluoride with a purity of 90% or more and preferably 98% or more can be recovered and also a fluorine removal ratio of 90% or more, preferably 97% or more, and more preferably 99% or more can be achieved by the two calcium carbonate packed towers.

The calcium carbonate granules having the volume mean diameter of the calcium carbonate granules in the above-described specific range have preferably a ratio of fine calcium carbonate granules having a diameter of lower than 20 μm is 15% or lower, preferably 5% or lower, and more preferably 1% or lower.

Even if the calcium carbonate granules have the volume mean diameter in the above-described specific range, when the granules contain a large amount of fine granules with a diameter of lower than 20 μm have a tendency such that fine calcium carbonate granules leak from the calcium carbonate packed towers due to the carbonic acid gas generated by the reaction of the calcium carbonate and the hydrogen fluoride in the raw water, so that the treatment becomes unstable and the fluorine removal ratio also decreases.

In the invention, the mechanism of the action of improving the effects of the increase in the purity of the recovered calcium fluoride and the increase in the fluorine removal ratio by the use of the calcium carbonate granules with an appropriate volume mean diameter is considered as follows.

In the treatment of fluorine-containing water by calcium carbonate, the calcium carbonate is changed to the calcium fluoride by the reaction of hydrogen fluoride to the calcium carbonate represented by the following reaction formula (1).

$$CaCO_3 + 2HF \rightarrow CaF_2 + H_2O + CO_2 \tag{1}$$

This reaction gradually progresses from the surface of calcium carbonate granules. The reaction rate at this time can be represented by a model equation represented by the following equation (2), and the reaction rate becomes high in inverse proportion to the square of the granule radius.

$$-r_A = \frac{3\phi D_{Av}}{R^2} C_{Al} \frac{(1-x_B)^{1/3}}{1-(1-x_B)^{1/3}} \tag{2}$$

$r_A$: Reaction rate, R: Particle radius

In terms of the reaction rate, the calcium carbonate granules are preferable to have a small diameter. By reducing the diameter of the calcium carbonate granules, the rising of the breakthrough curve of fluorine becomes sharp as illustrated in FIG. 5, so that a high fluorine removal ratio can be achieved even in the case where the calcium carbonate packed towers (reaction towers) are arranged in two stages. When the diameter of the calcium carbonate granules is excessively large, the substitution to calcium fluoride is not sufficiently performed to the inside of the calcium carbonate granules in some cases. Therefore, the diameter of the calcium carbonate granules is preferably relatively small also in terms of the purity of the recovered calcium fluoride. However, when the diameter of the calcium carbonate granules is excessively small, fine granules of the calcium carbonate leak from the calcium carbonate packed towers due to carbonic acid gas generated by the reaction of the calcium carbonate and the hydrogen fluoride, so that the treatment becomes unstable, and the fluorine removal ratio decreases.

In view of the above, calcium carbonate granules with a volume mean diameter of 30 to 150 μm, preferably 30 to 100 μm, and more preferably 40 to 90 μm are used in the invention.

In the invention, when the flow rate of the raw water into the calcium carbonate packed towers is too high, the reaction of the calcium carbonate and the fluorine in the raw water does not sufficiently progress and a problem of leakage of fine granules arises. In contrast, when the flow rate is excessively low, the treatment efficiency decreases. Therefore, the SV of the raw water flowing through the calcium carbonate packed towers is preferably about 0.1 to 5 hr$^{-1}$ and more preferably about 0.3 to 2 hr$^{-1}$.

The raw water flowing through the calcium carbonate packed towers preferably has a pH of about 4 to 6. Therefore, it is preferable that the pH of the raw water is controlled as required, and thereafter the raw water is passed through the calcium carbonate packed towers. Moreover, as described in Patent Document 2, it is more preferable that an α value is calculated from the fluorine concentration and the acid concentration of the raw water, and then acid or alkali is added based on the a value as an index to adjust the raw water.

Since the calcium fluoride recovered from the calcium carbonate packed towers by the invention has high purity, the calcium fluoride can be reused as a raw material for manufacturing hydrofluoric acid. The hydrofluoric acid is manufactured by reacting concentrated sulfuric acid with calcium fluoride according to the reaction of the following reaction formula (3). However, in this case, since the diameter of the calcium carbonate granules for use in the invention is relatively small, the particle diameter of calcium fluoride obtained by the treatment of the raw water is also relatively small, so that the reaction rate with concentrated sulfuric acid also becomes high. Therefore, the calcium fluoride thus obtained is suitable as a raw material for manufacturing hydrofluoric acid.

$$CaF_2 + H_2SO_4 \rightarrow 2HF + CaSO_4 \quad (3)$$

The invention can be effectively applied to treatment of high concentration fluorine-containing water with a fluorine concentration of about 2000 to 100000 mg/L which is discharged from a fluorine etching process or the like, a low concentration fluorine-containing water with a fluorine concentration of about 20 to 1000 mg/L, or a mixed water thereof.

EXAMPLES

Hereinafter, the invention is more specifically described with reference to Examples and Comparative Examples.

The following Examples employed raw water prepared by diluting reagent hydrofluoric acid with pure water to adjust the concentration to 10,000 mg–F/L (pH 3.5).

Example 1

150 ml of calcium carbonate granules with a volume mean diameter of 30 μm were packed in each of two towers (columns) having an inner diameter of 20 mm. Calcium carbonate packed towers thus formed were arranged in series in two stages as illustrated in FIG. 1. Then, raw water was passed through the calcium carbonate packed tower 1 and the calcium carbonate packed tower 2 in this order to be treated. The supply rate of the raw water pump 4 was 300 mL/hr and the SV of the water flowing into the packed towers 1 and 2 was 2 hr$^{-1}$. When the fluorine concentrations of the water flowing into the tower 1 and the water flowing out therefrom became the same, feeding the raw water to the tower 1 was stopped, the granules in the tower 1 were extracted, and then 150 ml of fresh calcium carbonate granules with a volume mean diameter of 40 μm were packed in the tower 1. After re-packing the calcium carbonate, the raw water was made flow through the tower 2 and the tower 1 in this order to be treated.

The results of measuring the fluorine ion concentration of the treated water and the total fluorine concentration and analyzing components contained in the extracted granules are shown in Table 1.

As shown in Table 1, in this Example, the treatment was stably performed with a fluorine removal ratio of 90% or more. Moreover, the calcium fluoride purity of the recovered substance was 98% or more, so that a high purity calcium fluoride crystal was obtained.

Example 2

Example 2 was conducted in the same manner as in Example 1, except using calcium carbonate granules with a volume mean diameter of 90 μm. The results are shown in Table 1.

As shown in Table 1, in this Example 2, the treatment was stably performed with a fluorine removal ratio of 90% or more. Moreover, the calcium fluoride purity of the recovered substance was 98% or more, so that a high purity calcium fluoride crystal was obtained.

Example 3

Example 3 was conducted in the same manner as in Example 1, except using calcium carbonate granules with a volume mean diameter of 150 μm as the calcium carbonate granules. The results are shown in Table 1.

As shown in Table 1, in this Example 3, the treatment was stably performed with a fluorine removal ratio of 90% or more. Moreover, the calcium fluoride purity of the recovered substance was 98% or more, so that a high purity calcium fluoride crystal was obtained.

Comparative Example 1

Comparative Example 1 was conducted in the same manner as in Example 1, except using calcium carbonate granules with a volume mean diameter of 20 μm as the calcium carbonate granules. The results are shown in Table 1.

In this Comparative Example 1, fine calcium carbonate granules leaked from the calcium carbonate packed towers due to carbonic acid gas generated by the reaction of the calcium carbonate and the hydrogen fluoride. Therefore, the fluorine removal ratio was lower than 90%, and the treatment became unstable. When the fine granules which leaked were analyzed, it was found that fine granules with a diameter of lower than 20 μm leaked.

Comparative Example 2

Comparative Example 2 was conducted in the same manner as in Example 1, except using calcium carbonate granules with a volume mean diameter of 250 μm as the calcium carbonate granules. The results are shown in Table 1.

In this Comparative Example 2, since the diameter of the calcium carbonate granules was large, the reaction rate of the calcium carbonate and the hydrogen fluoride was low. Therefore, the treatment was not sufficiently performed by the two calcium carbonate packed towers, so that the fluorine removal ratio was lower than 90%. Moreover, since the progress of the reaction to the inside of the calcium carbonate granules took long time, the calcium fluoride purity of the obtained recovered substance was low as compared with that of the Examples.

TABLE 1

|  | Volume mean diameter of calcium carbonate (μm) | Raw water T-F concentration mg/L | Treated water T-F concentration mg/L | Treated water F⁻ concentration mg/L | F removal ratio % | CaF$_2$ purity of recovered substance % |
|---|---|---|---|---|---|---|
| Example 1 | 30 | 10000 | 200~400 | 5~20 | 96~98 | >98 |
| Example 2 | 90 | 10000 | 10~30 | 10~30 | >99 | >98 |
| Example 3 | 150 | 10000 | 100~300 | 100~300 | 97~99 | >98 |
| Comparative Example 1 | 20 | 10000 | 2300~4200 | 10~20 | 58~77 | >98 |
| Comparative Example 2 | 250 | 10000 | 1000~1500 | 1000~1500 | 85~90 | 95~98 |

Examples 4 to 7

Examples 4-7 were conducted in the same manner as in Example 2, except using calcium carbonate granules with a volume mean diameter of 90 μm and having various granule size distributions as the calcium carbonate granules. The results are shown in Table 2.

Table 2 shows the following facts.

When fine granules are hardly contained (Example 4), the treatment was stably performed with a fluorine removal ratio of 90% or more. Moreover, the calcium fluoride purity of the recovered substance was 98% or more, so that a high purity calcium fluoride crystal was obtained.

However, when fine granules were contained, fine granules with a diameter of lower than 20 μm leaked from the calcium carbonate packed towers due to carbonic acid gas generated by the reaction of the calcium carbonate and the hydrogen fluoride. Therefore, when the amount of fine granules with a diameter of lower than 20 μm is small (Example 5), no problems arise. However, when such fine granules were contained at a ratio of 15% or more (Examples 6 and 7), the fluorine removal ratio was lower than 90% in some cases, the treatment became unstable.

The invention is described in detail with reference to specific aspects. However, it is clear for a person skilled in the art to alter the aspects in various manners without deviating from the scope of the intention.

The invention claimed is:

1. A device for treating fluorine-containing water, comprising:
   calcium carbonate packed towers configured to treat the fluorine-containing water having a fluorine concentration of 2,000 to 100,000 mg/L, arranged in series in a plurality of stages, to remove fluorine in the fluorine-containing water at a fluorine removal ratio of 90% or more and recover calcium fluoride;
   a first pipe connected to the calcium carbonate packed towers configured to pass the fluorine-containing water through the calcium carbonate packed towers, and having one portion connected to one of the calcium carbonate packed towers and having a first valve, and another portion connected to another of the calcium carbonate packed towers through a second valve;
   a raw water tank connected to the first pipe to supply the fluorine-containing water in the raw water tank to one or another of the calcium carbonate packed towers;
   a reaction liquid tank arranged between the calcium carbonate packed towers;
   a second pipe connected to the one or another of the calcium carbonate packed towers configured to extract treated water from the calcium carbonate packed towers;
   a treated water tank connected to the one or another of the calcium carbonate packed towers through the second pipe;
   a third pipe having one portion connected to the one of the calcium carbonate packed towers and having a third valve, and another portion connected to the another of the calcium carbonate packed towers through a fourth valve;

TABLE 2

|  | Content of granules with a volume mean diameter of lower than 20 μm of calcium carbonate granules % | Raw water T-F concentration mg/L | Treated water T-F concentration mg/L | Treated water F⁻ concentration mg/L | F removal ratio % | CaF$_2$ purity of recovered substance % |
|---|---|---|---|---|---|---|
| Example 4 | <1 | 10000 | 10~30 | 10~30 | >99 | >98 |
| Example 5 | 5 | 10000 | 30~300 | 10~30 | 97~99 | >98 |
| Example 6 | 16 | 10000 | 200~1100 | 10~30 | 89~98 | >98 |
| Example 7 | 25 | 10000 | 600~1500 | 10~30 | 85~94 | >98 | a fourth pipe connected to the reaction water tank and including a portion connected to an inlet of the another of the calcium carbonate packed towers and having a fifth valve, and another portion connected to an inlet of the one of the calcium carbonate packed towers and having a sixth valve;

a fifth pipe connected to the treated water tank through the second pipe, and including a portion connected to an exit of the one of the calcium carbonate packed towers and having a seventh valve, and another portion connected to an exit of the another of the calcium carbonate packed towers and having an eighth valve, wherein a volume mean diameter of calcium carbonate granules packed in the calcium carbonate packed towers is 40 to 100 μm, and the calcium carbonate granules contain granules with a particle diameter of lower than 20 μm at a ratio of 15% or lower.

2. The device for treating fluorine-containing water according to claim 1, wherein the calcium carbonate packed towers are arranged in series in two stages.

3. The device for treating fluorine-containing water according to claim 1, wherein an SV of the passage of the fluorine-containing water into the calcium carbonate packed towers is 0.1 to 5 $hr^{-1}$.

4. The device for treating fluorine-containing water according to claim 1, wherein the first to eighth valves are arranged such that when the first valve, the third valve, the fifth valve, and the eighth valve are opened and the second valve, the fourth valve, the sixth valve, and the seventh valve are closed, the fluorine-containing water in the raw water tank is passed through the one of the calcium carbonate packed towers to supply outflow water of the one of the calcium carbonate packed towers to the reaction liquid tank, a liquid in the reaction liquid tank is passed through the another of the calcium carbonate packed towers, and outflow water from the another of the calcium carbonate packed towers is supplied to the treated water tank.

5. The device for treating fluorine-containing water according to claim 4, wherein the first to eighth valve are arranged such that when the first valve, the third valve, the fifth valve, and the eighth valve are closed and the second valve, the fourth valve, the sixth valve, and the seventh valve are opened, fluorine-containing water in the raw water tank is passed through the another of the calcium carbonate packed towers to supply outflow water of the another of the calcium carbonate packed towers to the reaction liquid tank, a liquid in the reaction liquid tank is passed through the one of the calcium carbonate packed towers, and outflow water from the one of the calcium carbonate packed towers is supplied to the treated water tank.

* * * * *